(12) United States Patent
Zhang

(10) Patent No.: US 9,069,913 B2
(45) Date of Patent: Jun. 30, 2015

(54) CIRCUIT TOPOLOGY FOR MULTIPLE LOADS

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Feng Zhang, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 19 days.

(21) Appl. No.: 14/013,924

(22) Filed: Aug. 29, 2013

(65) Prior Publication Data

US 2014/0167879 A1 Jun. 19, 2014

(30) Foreign Application Priority Data

Dec. 17, 2012 (CN) .......................... 2012 1 0547383

(51) Int. Cl.
| | |
|---|---|
| H01P 5/12 | (2006.01) |
| H03H 7/38 | (2006.01) |
| G06F 13/42 | (2006.01) |
| G06F 13/40 | (2006.01) |

(52) U.S. Cl.
CPC ............. *G06F 13/42* (2013.01); *Y02B 60/1228* (2013.01); *Y02B 60/1235* (2013.01); *G06F 13/4086* (2013.01)

(58) Field of Classification Search
CPC .................................... H03H 7/38; H01P 5/12
USPC ............. 327/32, 33, 100, 125–128, 130, 134, 327/136; 333/32, 33, 100, 125–128, 130, 333/134, 136
See application file for complete search history.

(56) References Cited

U.S. PATENT DOCUMENTS

| | | | |
|---|---|---|---|
| 6,493,394 B2 * | 12/2002 | Tamura et al. ................. | 375/257 |
| 7,746,195 B2 * | 6/2010 | Hsu et al. ....................... | 333/130 |

* cited by examiner

*Primary Examiner* — Hai L Nguyen
(74) *Attorney, Agent, or Firm* — Novak Druce Connolly Bove + Quigg LLP

(57) ABSTRACT

A circuit topology to reduce ringing and the strength of unwanted signals includes a signal transmitting terminal, a first signal receiving terminal, and a second signal receiving terminal. The signal transmitting terminal receives a first DC voltage via a first node and a first resistor. The first node is electrically connected to a second node via a third resistor and an energy consuming element. The energy consuming element weakens the voltage level of noise signals on the second signal receiving terminal, therefore, signal reflections from the second signal receiving terminal are reduced, and signal integrity at the first signal receiving terminal is improved.

15 Claims, 3 Drawing Sheets

CIRCUIT TOPOLOGY FOR MULTIPLE LOADS

BACKGROUND

1. Technical Field

The present disclosure relates to a circuit topology, and particularly to a circuit topology for multiple loads on a mother board.

2. Description of Related Art

Signal integrity is an important factor to be taken into account when a printed circuit board (PCB) is designed. A well-designed PCB has an elevated on-off switching speed for integrated circuits, and a high density, compact layout of components. Parameters of the components and the PCB substrate, a layout of the components on the PCB, and a layout of high-speed signal transmission lines all have an impact on signal integrity. In turn, proper signal integrity helps the PCB and an associated computer system to achieve stable performance. Layout of the components is considered as an important part of signal integrity. Signals that reflect back and forth along the transmission line cause what is called "ringing," which is undesirable.

Therefore, there is a need for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
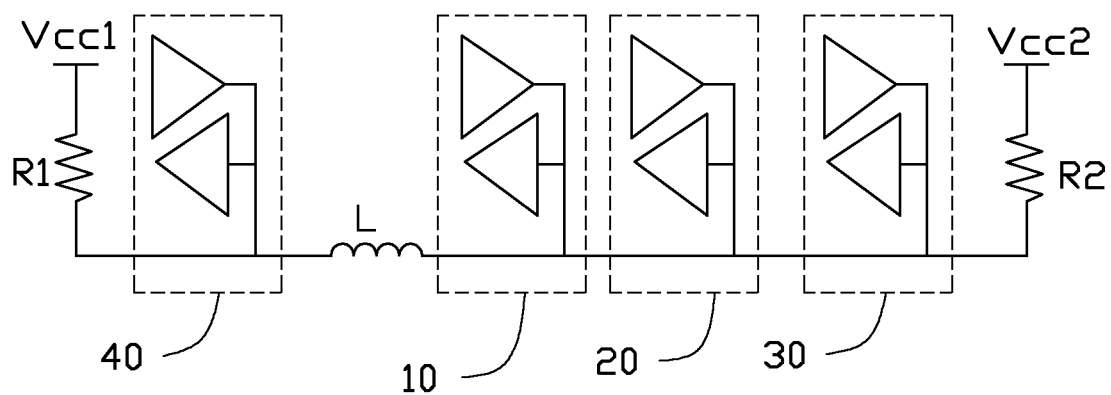
FIG. 1 is an isometric view of an embodiment of a circuit topology for multiple loads.

FIG. 1 shows a circuit topology which includes a signal transmitting terminal 40 electrically connected to a first signal receiving terminal 10, a second signal receiving terminal 20, and a third signal receiving terminal 30. The signal transmitting terminal 40 receives a first DC voltage VCC1 via a first resistor R1. The third signal receiving terminal 30 receives a second DC voltage VCC2 via a second resistor R2. In one embodiment, the signal transmitting terminal 40 is a controller terminal, and the first signal receiving terminal 10, the second signal receiving terminal 20, and the third signal receiving terminal 30 are device terminals. In a second embodiment, the controller terminal 40 can also be signal receiving terminal, and the device terminals 10, 20, and 30 can also be signal transmitting terminals.

Figure 2:
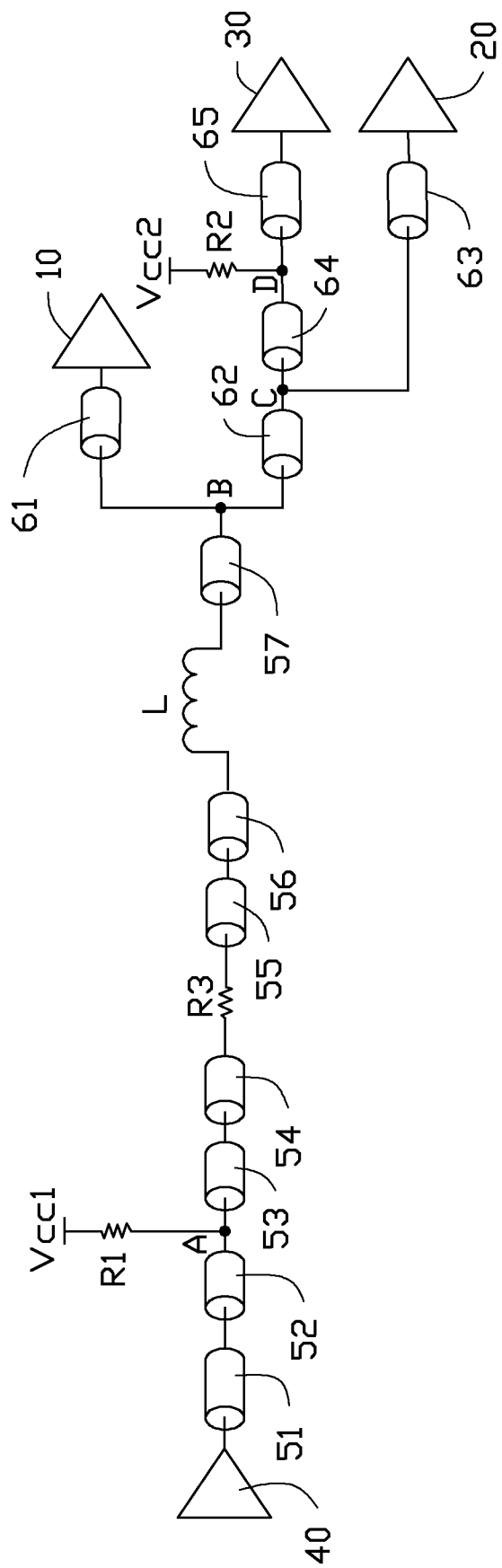
FIG. 2 is a circuit diagram of the circuit topology for multiple loads of FIG. 1.

FIG. 2 shows the signal transmitting terminal 40 which is electrically connected to a first node A via a first main transmission line 51 and a second main transmission line 52 in series. The first node A is electrically connected to the first DC voltage VCC1 via the first resistor R1. The first node A is electrically connected to a first terminal of a third resistor R3 via a third main transmission line 53 and a fourth main transmission line 54. A second terminal of the third resistor R3 is electrically connected to a first terminal of an inductor L via a fifth main transmission line 55 and a sixth main transmission line 56. A second terminal of the inductor L is electrically connected to a second node B via a seventh main transmission line 57. The second node B is electrically connected to the first signal receiving terminal 10 via a first branch transmission line 61. The second node B is electrically connected to a third node C via a second branch transmission line 62. The third node C is electrically connected to the second signal receiving terminal 20 via a third branch transmission line 63. The third node C is electrically connected to a fourth node D via a fourth branch transmission line 64. The fourth node D is electrically connected to the second DC voltage VCC2 via the second resistor R2. The fourth node D is electrically connected to the third signal receiving terminal 30 via a fifth branch transmission line 65.

In one embodiment, a resistance of the first resistor R1 and the second resistor R2 is 100 ohms A resistance of the third resistor R3 is 0 ohms. An inductance of the inductor L is 100 nano-Henries (nH). A length of the first main transmission line 51 is 23 mils. A length of the second main transmission line 52 is 832 mils. A length of the third main transmission line 53 is 540 mils. A length of the fourth main transmission line 54 is 67 mils. A length of the fifth main transmission line 55 is 38 mils. A length of the sixth main transmission line 56 is 931 mils. A length of the seventh main transmission line 57 is 3046 mils. A length of the first branch transmission line 61 is 94 mils. A length of the second branch transmission line 62 is 9155 mils. A length of the third branch transmission line 63 is 94 mils. A length of the fourth branch transmission line 64 is 2601 mils. A length of the fifth branch transmission line 65 is 94 mils. The first DC voltage VCC1 and the second DC voltage VCC2 are 1.05 volts.

In a second embodiment, the signal transmitting terminal 40 is grounded via the first resistor R1, and the third signal receiving terminal 30 is grounded via the second resistor R2. In a third embodiment, the signal transmitting terminal 40 receives the first DC voltage VCC1 via the first resistor R1, and the third signal receiving terminal 30 is grounded via the second resistor R2. In a fourth embodiment, the signal transmitting terminal 40 is grounded via the first resistor R1, and the third signal receiving terminal 30 receives the second DC voltage VCC2 via the second resistor R2. The different connections of the signal transmitting terminal 40, the first resistor R1, the third signal receiving terminal 30, and the second resistor R2 are chosen according to different types of the signal transmitting terminal 40 and the signal receiving terminals 10-30.

In one embodiment, the first resistor R1 is located on a first side of the signal transmitting terminal 40 away from the inductor L, and the second resistor R2 is located on a first side of the third signal receiving terminal 30 away from the inductor L. In a second embodiment, the first resistor R1 is located on a second side of the signal transmitting terminal 40 close to the inductor L, and the second resistor R2 is located on a second side of the third signal receiving terminal 30 close to the inductor L. However, a distance between the first resistor R1 and the signal transmitting terminal 40 is less than one fifth of a wavelength of a signal sent by the signal transmitting terminal 40, and a distance between the second resistor R2 and the third signal receiving terminal 30 is less than one fifth of a wavelength of the second embodiment. The wavelength of the signal can be calculated according to:

$$\frac{V}{W \times \sqrt{Er}},$$

wherein, V is velocity of light. W is bandwidth of signal, Er is permittivity of PCB. The bandwidth of signal can be further calculated according to:

$$\frac{0.35}{T},$$

wherein, T is rising time or falling time of signal.

In one embodiment, a distance between the inductor L and the signal transmitting terminal 40 is equal to a distance between the inductor L and the first signal receiving terminal 10. In a second embodiment, a distance between the inductor L and the first signal receiving terminal 10 is 0.2 to 0.8 times of the distance between the signal transmitting terminal 40 and the first signal receiving terminal 10. The inductor L can be replaced by other energy consuming element such as a Ferrite Bead.

In use, a signal sent by the signal transmitting terminal 40 is transmitted to the second node B along the main transmission lines 51-57. The signal is transmitted to the first signal receiving terminal 10 and the third node C along the branch transmission lines 61 and 62 from the second node B. The signal is transmitted to the second signal receiving terminal 20 and the third signal receiving terminal 30 along the branch transmission lines 63-65 from the third node C. A resistance of the inductor L is low and approaches zero when a frequency of the signal is low. The resistance of the inductor L increases as the frequency of the signal increases. The inductor L weakens the voltage level of noise signals on the third signal receiving terminal 30, therefore, signal reflections from the third signal receiving terminal 30 are reduced, and signal integrity at the first signal receiving terminal 10 and the second signal receiving terminal 20 is improved.

Figure 3:
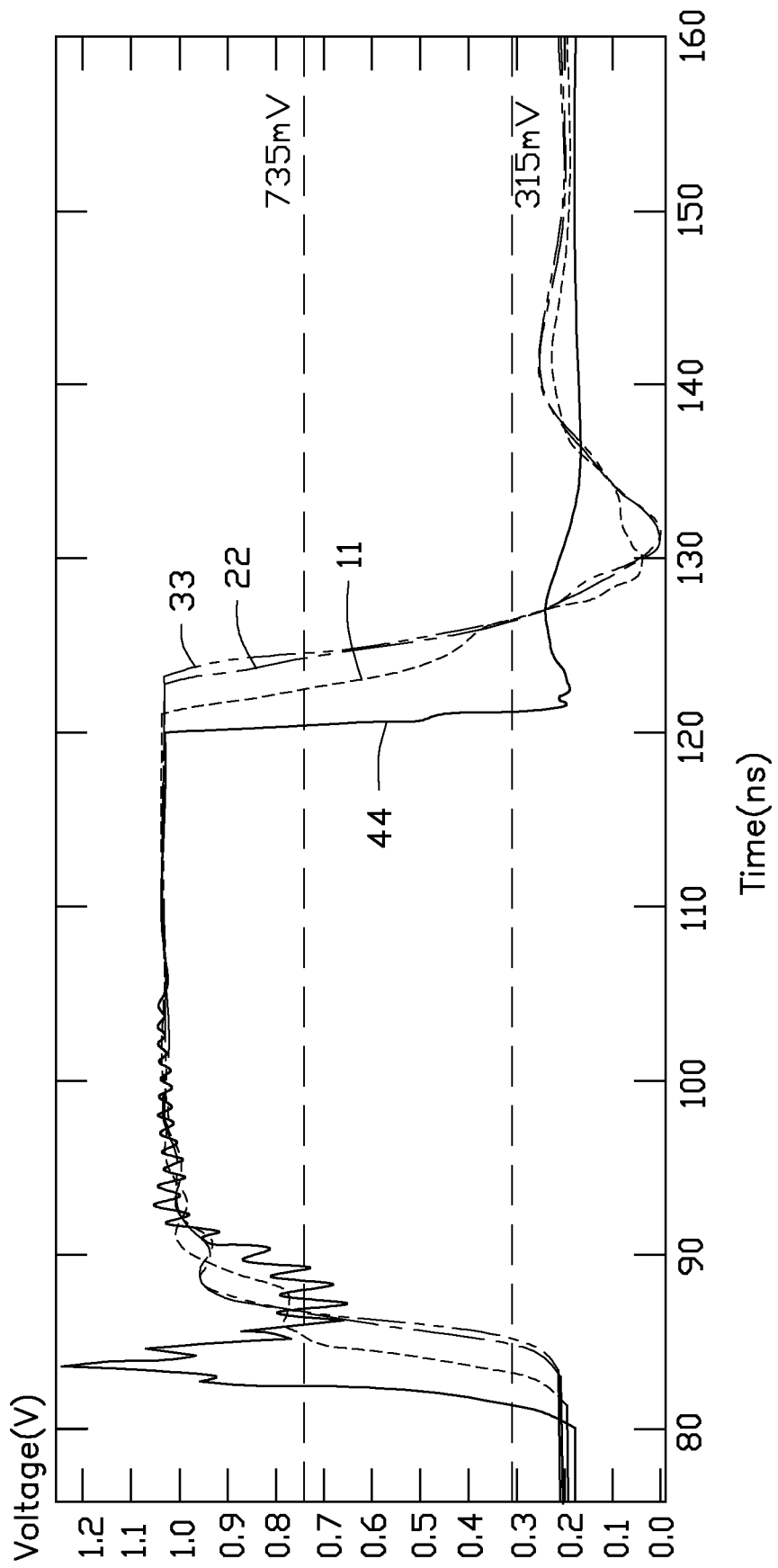
FIG. 3 is a comparative graph showing signal waveforms obtained at each signal receiving terminal using the circuit topology of FIG. 2.

FIG. 3 shows a graph showing signal waveforms obtained at each of the signal receiving terminals 10, 20, 30 using the circuit topology of FIG. 2, in which signal waveforms 11, 22, 33, and 44 correspond to the signal receiving terminals 10, 20, 30 and the signal transmitting terminal 40. Clearly, signal reflections are reduced and signal integrity is maintained.

In the above-described circuit topology of the embodiment, the signal transmitting terminal 40, and the signal receiving terminals 10, 20, 30 are used as examples, a number of the signal receiving terminals can be increased or decreased according to requirements of layout in the circuit topology. However, the circuit topology should include at least two device terminals (e.g. device terminals 10, 20). The controller terminal 40 can transmit signals to any one of the device terminals 10, 20, 30, and vice versa. However, the device terminals 10, 20, 30 cannot transmit signals to each other. In other embodiments, the circuit topology which has an energy consuming element connected to the receiving terminal, to which a signal must travel a greater distance, may be used for multiple other loads on a PCB.

Even though numerous characteristics and advantages of the present disclosure have been set forth in the foregoing description, together with details of the structure and function of the disclosure, the disclosure is illustrative only, and changes may be made in detail, especially in the matters of shape, size, and the arrangement of parts within the principles of the disclosure to the full extent indicated by the broad general meaning of the terms in which the appended claims are expressed.

What is claimed is:

1. A circuit topology, comprising:
   a signal transmitting terminal adapted to receive a first DC voltage via a first node and a first resistor; the first node is electrically connected to a second node via a third resistor and an energy consuming element;
   a first signal receiving terminal electrically connected to the second node; the second node is electrically connected to a third node; and
   a second signal receiving terminal electrically connected to the third node; the third node is electrically connected to a second DC voltage via a second resistor,
   wherein the energy consuming element is an inductor or a Ferrite Bead.

2. The circuit topology of claim 1, wherein the first DC voltage and the second DC voltage are 1.05 volts.

3. The circuit topology of claim 1, wherein a distance between the energy consuming element and the signal transmitting terminal is equal to a distance between the energy consuming element and the first signal receiving terminal.

4. The circuit topology of claim 1, wherein a distance between the energy consuming element and the first signal receiving terminal is 0.2 to 0.8 times of a distance between the signal transmitting terminal and the first signal receiving terminal.

5. The circuit topology of claim 4, wherein a resistance of the first resistor and the second resistor is 100 ohm; and an inductance of the inductor is 100 nano-Henries.

6. The circuit topology of claim 1, further comprising a third signal receiving terminal electrically connected to a fourth node between the third node and the second resistor.

7. The circuit topology of claim 6, wherein the first resistor is located on a second side of the signal transmitting terminal close to the energy consuming element; and the second resistor is located on a second side of the third signal receiving terminal close to the energy consuming element.

8. The circuit topology of claim 6, wherein the first resistor is located on a first side of the signal transmitting terminal away from the energy consuming element; and the second resistor is located on a first side of the third signal receiving terminal away from the energy consuming element.

9. The circuit topology of claim 8, wherein a distance between the first resistor and the signal transmitting terminal is less than one fifth of a wavelength the signal sent by the signal transmitting terminal; and a distance between the second resistor and the third signal receiving terminal is less than one fifth of the wavelength.

10. A circuit topology, comprising:
    a signal transmitting terminal adapted to receive a first DC voltage via a first node and a first resistor; the first node is electrically connected to a second node via a third resistor and an energy consuming element;
    a first signal receiving terminal electrically connected to the second node; the second node is electrically connected to a third node; and
    a second signal receiving terminal electrically connected to the third node; the third node is electrically connected to a second DC voltage via a second resistor; wherein the first resistor is located on a first side of the signal transmitting terminal away from the energy consuming element; and the second resistor is located on a first side of the second signal receiving terminal away from the energy consuming element, wherein the energy consuming element is an inductor or a Ferrite Bead.

11. The circuit topology of claim 10, further comprising a third signal receiving terminal electrically connected to a fourth node between the third node and the second resistor.

12. The circuit topology of claim 10, wherein a distance between the energy consuming element and the signal transmitting terminal is equal to a distance between the energy consuming element and the first signal receiving terminal.

13. The circuit topology of claim 10, wherein a distance between the energy consuming element and the first signal receiving terminal is 0.2 to 0.8 times of a distance between the signal transmitting terminal and the first signal receiving terminal.

14. The circuit topology of claim 10, wherein a resistance of the first resistor and the second resistor is 100 ohm; and an inductance of the inductor is 100 nano-Henries.

15. The circuit topology of claim 10, wherein the first DC voltage and the second DC voltage are 1.05 volts.

* * * * *